May 21, 1935.  I. GOTH  2,001,841

SHOE WITH ELASTIC RUBBER INSERT

Filed Nov. 25, 1932

Inventor:

Patented May 21, 1935

2,001,841

UNITED STATES PATENT OFFICE 2,001,841

SHOE WITH ELASTIC RUBBER INSERT

Imre Goth, Berlin, Germany

Application November 25, 1932, Serial No. 644,297
In Germany November 29, 1931

4 Claims. (Cl. 36—51)

The manner of fixing solid rubber inserts in shoes or boots described in the main patent application No. 536,572 filed May 5, 1931 requires several technical improvements for manufacturing.

Thus, it is desirable to protect by suitable means the edges of the shoe material against bending over under friction, for example during the cleaning of the shoe, and to make non-elastic the parts of the elastic rubber insert which are fixed to the material of the shoe, so that the points of fixation are not expansively stressed and therefore besides cementing and vulcanizing other means of fixing may also be employed.

This is attained according to the present invention in that the edges of the shoe material, which are attached to the rubber insert, are directly surrounded by a raised layer or protecting section of the solid rubber insert.

In order to prevent the expansion of the rubber at the points of fixation, one or more non-elastic fabric layers, such as canvas, are vulcanized in or on the portions of the rubber insert which serve for attaching to the material of the shoe (leather, canvas, silk or the like). Thus, on the one hand the cemented edges of the leather or other material are protected against overstressing or possible severance as the rubber cannot expand at the points of fixation and the direct surrounding of the leather is maintained constant in that the protecting profile of the rubber insert is not subjected to any distortion, and on the other hand the edges of the rubber, which are now non-elastic, enable besides cementing and vulcanizing other means of attachment to be employed. Thus, the narrowed edges of the rubber insert, which only consist of canvas strips coated with a rubber layer, are attached by sewing without any danger of tearing.

Moreover, the fixation can be effected by means of rivets, eyes, press-buttons or the like.

Several embodiments of the invention are illustrated by way of example in the accompanying drawing in which:—

Protecting sections $g$ of the solid rubber insert $a$ extend along the fixation edges of the upper-leather $b$, lining leather $c$ and leather strips $e$, $d$, so that the skived edges of the leather extend directly from and are protected against being bent over under friction by the sections $g$, a variation of the distance between the leather edges and the protecting sections being prevented by the linen layer $f$ vulcanized in the rubber insert and rendering non-elastic the necessary portions of this insert.

Figure 1:
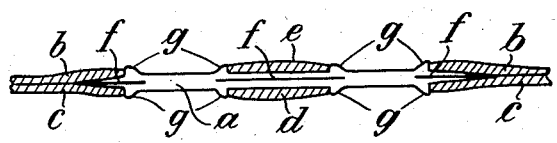
Fig. 1 shows one form of construction in cross-section.
Figure 2:
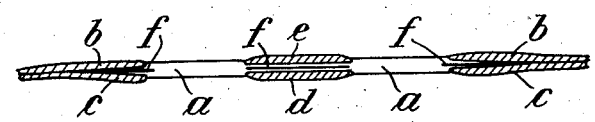
Fig. 2 is a cross section of a second form of construction.

The rubber insert $a$ (Fig. 2) may also be made of such section that the upper and lining leathers $b$, $c$ and the leather strips $e$, $d$, if provided, are partly embedded in the rubber insert so that the skived edges of the leather are surrounded and protected by the adjacent rubber portions. In the case of linen and silk shoes it is not possible to skive the material, and this is also not necessary owing to its thinness. The linen layer $f$ in this arrangement fulfils the same function as above.

The embedding of the shoe material or the narrowing of the edges of the rubber insert may be such that the fixation of the shoe material $b$, $c$, $d$, $e$ to the linen now only coated with a thin rubber layer can be effected by sewing without any difficulty.

Figure 3:
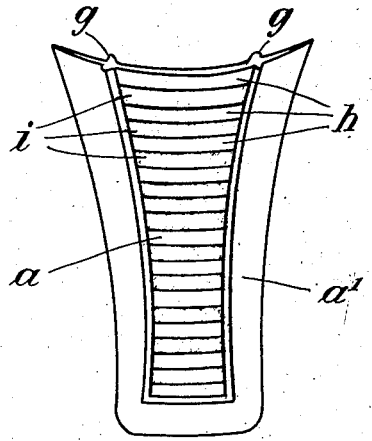
Fig. 3 is a top plan view showing a form of construction without leather strips.
Figure 4:
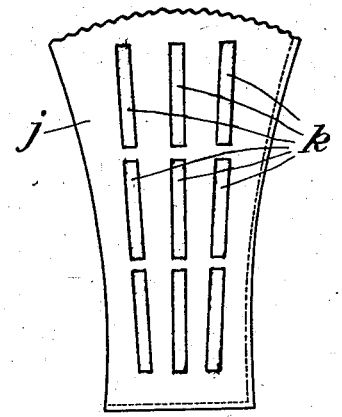
Fig. 4 shows in plan view a tongue adapted to be attached to the under side of the insert shown in Fig. 3.

Fig. 3 shows in plan view a solid rubber insert $a$ without leather strips, the skived edges being designated by $a'$, the protecting section for the leather edge by $g$, and the section serving as pattern with $h$, $i$. This figure at the same time shows a form of construction with ventilation apertures. The recessed sections $i$ are formed by the material being omitted and serve as ventilation apertures, whereas the raised sections $h$ remain as separate elastic strips. A tongue $j$ (Fig. 4) on the under side of the insert and sewn along one of its longitudinal edges to the material of the shoe, may likewise be provided with ventilation apertures $k$ which extend at right angles to the apertures $i$ in the rubber insert, that is in the longitudinal direction of the tongue.

I claim:—

1. A shoe with elastic rubber insert, comprising in combination with the upper and lining of the shoe, said upper and lining having registering apertures, solid rubber inserts in said apertures covering the edges thereof.

2. A shoe with elastic rubber insert, comprising in combination with the upper and lining of the shoe, said upper and lining having registering apertures, solid rubber inserts in said apertures covering the edges thereof, and non elastic fabric strips vulcanized in the edges of said inserts, said fabric strips covered with the rubber of said inserts being attached to said upper and lining.

3. A shoe with elastic rubber insert, comprising in combination with the upper and lining of the shoe, said upper and lining having registering apertures, solid rubber inserts in said apertures covering the edges thereof, non elastic fabric strips vulcanized in the edges of said inserts, said fabric strips covered with the rubber of said inserts being attached to said upper and lining, and a rubber strip embedded in said inserts and covered at its edges by the rubber of said inserts.

4. A shoe with elastic rubber insert, comprising in combination with the upper and lining of the shoe and a tongue attached on said lining along one longitudinal edge, said tongue having longitudinal ventilation apertures, said upper and lining having registering apertures, solid rubber inserts in said apertures covering the edges thereof, and non elastic fabric strips vulcanized in the edges of said inserts, said fabric strips covered with the rubber of said inserts being attached to said upper leather and lining.

IMRE GOTH.